United States Patent Office 2,847,302
Patented Aug. 12, 1958

2,847,302

ALLOYS FOR BONDING TITANIUM BASE METALS TO METALS

Roger A. Long, Bay Village, Ohio

No Drawing. Application March 4, 1953
Serial No. 340,383

2 Claims. (Cl. 75—134)

This invention relates to improved furnace brazing alloys suitable for forming joints having a high tensile strength at elevated temperatures. The development of the controlled atmosphere furnace brazing process has made possible the application of the furnace brazing processes to the bonding of metals to produce joints with qualities unheard of in the original plain copper and silver alloy braze era. To cite a simple, but important and typical example, the gas turbine compressor blade of aircraft engines may operate at temperatures as high as 800° F., requiring the use of solid forgings and/or castings of nickel-chromium alloys for both the blades proper and their attaching bases. In view of the geographically critical nature of such alloys and the advantages that are obtainable if the base and blade materials could be selected to best perform their individual functions. Not only the components, but the bond itself must have the necessary tensile, shear, and stress rupture strength and creep qualities at the elevated temperatures encountered.

Great interest has been shown, for example, in the use of titanium or titanium alloys for the blade material because of the low density of these metals and their strength at elevated temperatures. Obviously, important advantages would be obtainable if the blades could be fabricated by brazing (bonding) blades of a titanium or its alloys with a mounting base formed of stainless steel or the like, or to titanium or titanium alloy parts formed separately by a different method. I have performed wetting and joining tests utilizing titanium and its alloys with stainless steel and steel and have found that the characteristics of the braze and interface are similar to the examples that follow.

The behavior of these metals under forging, casting, machining, and the like, presents problems even if a given piece is to be made entirely of the same material, so regardless of whether titanium is to be joined to itself or to other metals, the nature, behavior, and characteristics of titanium and its alloys present serious problems for this service, important examples of which are:

(a) Titanium is, at present expensive.
(b) Titanium metal oxidizes slightly at room temperatures, the action becoming increasingly rapid as temperatures increase.
(c) Titanium oxide or dioxide resists bonding.
(d) Welding causes embrittlement, and promotes grain growth adjacent to the weld thereby rendering welding unfit for many applications.

A principal object of the invention resides in solving these problems and making possible the furnace bonding of titanium and its alloys to other metals or alloys of different selected characteristics. I have found that this can be accomplished by a process involving assembling the parts to be joined, applying to the joint a ground powder consisting primarily of the eutectic formed of 66% nickel and 34% titanium, by weight, heating the assembly to approximately 2000° F. for a short period of time and cooling. The cooling rate is variable as varies the mass of the parts involved, but for a given mass, it depends not only upon the characteristics of the titanium alloy itself, but also upon the mass of the joined parts. The titanium element in the eutectic (and to some extent the nickel metal) takes into solution any surface layer of titanium oxide that may exist on the base metal, thus causing the brazing alloy to be self fluxing or, in other words, to be its own flux to a substantial degree.

Another problem presented by the treatment of titanium and its alloys results from the grain growth that occurs at temperatures at and above about 1800° F. (time dependent), causing embrittlement and other undesirable qualities attendant with coarse grained metals. Thus from the standpoint of grain growth, an alloy having a melting point lower than that of the nickel-titanium eutectic is indicated, provided that other difficulties are not introduced.

In addition to the factor of grain growth, when arriving at a suitable alloy, another characteristic of the eutectic must be considered, namely the tendency of the nickel-titanium eutectic to provide a joint wherein the strength of the braze exceeds that of the interfaces of the joint (the interfaces being the zones of intersolution of base and braze metals). Although the nickel-titanium eutectic does give good joints, in addition to the possibility of grain growth at the temperatures needed for brazing, it provides also a joint with a substantial strength-hardness gradient or variation, when passing from base metal to base metal, which gradient could adversely effect the braze ductility, and fatigue characteristics of the bond.

In addition to the aforesaid object of providing means for joining titanium to metals, another object of the invention is to minimize grain growth, reduce the braze strength-hardness gradient (make the strength-hardness factors of the base metals, interfaces as nearly equal as possible), and to attain these advantages while holding to a minimum the porosity of the brazed joint.

In addition to use of the nickel-titanium eutectic referred to, the present invention comprehends a variety of brazing alloy powders all based on the 66% nickel—34% titanium eutectic, typical examples of which will be described in detail.

THE EUTECTIC PROCESS

The use of the nickel-titanium eutectic to solve the problem resulting from titanium oxidation by producing a self-fluxing brazing powder has been explained. The eutectic could be formed by grinding into a powder the solid solution of the metals formed by mixing titanium oxide and nickel oxide or powdered metallic nickel with powdered calcium hydride in a closed reducing retort until particles of the nickel-titanium eutectic are formed. Details of a suitable process are disclosed in the patent to Alexander 2,184,769 and an application Serial No. 256,300 of February 14, 1939, now abandoned, referred to in said patent, said process of formation forming no part of the present invention. The alloy can also be produced by direct alloying of nickel and titanium in correct weight proportions under an atmosphere other than oxidizing and then grinding said alloy to a powder or casting it in a rod form suitable for wire processing.

The ground powder is applied about the joint of the base parts (precleaned if necessary by etching, wire brushing, etc.), and the joint is preferably a shear type joint. A liquid volatile organic binder of a plastic type cement may be used if needed to hold the powder in place. The prepared assemblage is placed in a brazing furnace and raised to at least the melting temperature of the brazing powder (approximately 1750° F.–2000° F.), and the parts are held at this temperature long enough for the braze alloy and the base parts to inter-dissolve and form an interface. This time depends upon the size of the parts, among other factors, as is known in the brazing art. The atmosphere enveloping the parts while being heated and cooled may be a reducing atmosphere or vacuum but is preferably an inert or substantially inert atmosphere such as one formed of at least 85% helium or argon, the balance being hydrogen. The primary function of the atmosphere is to minimize the amount or quantity of titanium oxide, which oxide makes very difficult the production of sound joints. Cooling to room temperature is initiated as soon as experience shows that the brazing material has melted and alloyed to the desired amount, the problem of base metal titanium growth also dictating a minimum heating and cooling cycle. The brazed parts are cooled in the inert atmosphere to a temperature sufficiently low so that objectionable oxidation will not occur upon exposure to the air. Where one of the parts comprises titanium, for example, the parts should preferably remain in the inert atmosphere until cooled to 700° F.

In describing the characteristics of the joint produced by the above method as well as that produced by the brazing alloys to be described presently the base metals joined will be composed each of commercially pure titanium.

THE EUTECTIC JOINT—1950°–2000° F.
(Depending on titanium-nickel ratio)

Titanium base hardness (Ti brazed
  to Ti) _____ 20–28 Rockwell C.
Braze hardness _____ 43 Rockwell C.
Interface hardness _____ 22 Rockwell C.
Porosity _____ Negligible.

A joint made with the eutectic process may have a wide application and the production of the brazing powder itself is not complicated. In addition, I contemplate processes and methods that produce the aforesaid basic type joint having different properties that will be of interest in various applications.

VARIATIONS IN BRAZING POWDER COMPOSITION

The alloys to be given as examples hereafter are all various preferred variations in the eutectic alloy of 66% nickel—34% titanium hereinafter to be referred to as the "eutectic." In accordance with requirements at hand, I shall give representative examples of brazing powders that will meet such various requirements as well as brief discussions of the important desired data that will enable those skilled in this art to determine suitable brazing compositions based upon the characteristics desired.

It was stated that the melting point of the eutectic is about 2000° F. which in some cases results in base metal grain growth and brittleness (a time dependent function). When titanium or titanium alloys are brazed, I have found that the melting point of the braze material can be lowered by adding to the eutectic a metal of the copper group, namely copper or silver. Copper and manganese may also have a tendency to lower the melting temperature. Copper, however, would ordinarily be selected because of its lower cost. These metals are characterized by having a cubic crystalline structure and a tendency to form solid solutions. The effect on the melting point of adding copper is indicated as the following examples by weight:

Table I.—Melting point 1850° F. ±25° F.
(Varies as to Cu. content)
Eutectic _____ 65–75%.
Copper _____ 35–25%.
T base hardness _____ 20–28 Rockwell C.
Braze hardness _____ 39–40 Rockwell C.
Interface hardness _____ 28 Rockwell C.
Porosity _____ Slight.

It will be noted that the addition of copper has not only lowered the melting point of the braze, and so has in effect reduced grain growth, but has reduced the braze hardness, the braze being the hardest factor in the plain eutectic joint. This might be expected but what is unexpected, the addition of copper has increased the interface hardness, which coupled with a decrease in the braze hardness, materially decreases the hardness gradient between the base, interface and braze zones. These results are of importance. If less copper is added to the eutectic than that shown above, the melting point of the braze is higher. For example, a powder consisting by weight of 92% of the eutectic and 8% of copper will melt at about 1900° F. Copper (and silver gives similar results) also imparts strength, ductility and soundness to the braze. I have found that more than 35% of copper gives unsatisfactory strength whereas less than 8% does not sufficiently depress the melting point over that of the eutectic.

I have found that the addition of metals like chromium, manganese, and cobalt, increases the tensile and shear strength of the braze without seriously increasing the melting point, and in some case tends to smooth out the strength-hardness gradient of the joint. I have also found that beryllium functions when mixed with the eutectic and copper addition to give similar results as those obtained with the series mentioned above. Any tendency toward increased grain growth is counteracted by making the heating and cooling cycles as short as possible.

Table II.—Melting point 1900°–1950° F.
Eutectic _____ 90%.
Copper _____ 8%.
Chromium _____ 2%.
T base hardness _____ 20–28 Rockwell C.
Braze hardness _____ 25 Rockwell C.
Interface hardness _____ 25 Rockwell C.
Porosity _____ Slight.

The braze here is less strong than that of Table I. However, its hardness is reduced markedly, more than in any brazing alloy powder I have tested. The main point here is the levelling out of the hardness gradient across the braze for reasons mentioned previously. The slight porosity of the braze is acceptable in applications where stresses are relatively low.

Table III.—Melting point 1950° ±25° F.
Eutectic_____ 90%.
Cobalt_____ 8%.
Manganese_____ 2%.
T base hardness_____ 20–28 Rockwell C.
Interface hardness_____ 25 Rockwell C.
Braze hardness_____ 43 Rockwell C.
Porosity_____ Virtually none.

This braze equalled all others in hardness, excelled in porosity (the liquidus and solidus being close together), and although the hardness gradient is slightly higher than that of Tables I and II, the lack of porosity and high strength make this a superior brazing composition.

Table IV.—Melting point 1950° ±25° F.
Eutectic_____ 80%.
Copper_____ 15%.
Chromium_____ 5%.
T base hardness_____ 20–28 Rockwell C.
Interface hardness_____ 28 Rockwell C.
Braze hardness_____ 46 Rockwell C.
Porosity_____ Slight.

*Table V.—Melting point over 1900° F.*

| | |
|---|---|
| Eutectic | 80%. |
| Copper | 15%. |
| Cobalt | 5%. |
| T base hardness | 20–28 Rockwell C. |
| Interface hardness | 36 Rockwell C. |
| Braze hardness | 43 Rockwell C. |
| Porosity | Virtually none. |

Comparison of Tables IV and V reveals that the material of Table V gives excellent hardness transition from base to interface to braze to interface to base, and further reveals that cobalt is more effective than chromium in this regard, which is somewhat contrary to what would be expected based on the relative behavior and effects of these two metals in other alloys. This composition in Table V would give excellent high strength braze joints, greater than any yet evaluated.

The examples given employed commercially pure titanium as a base metal but T alloy metals may also be brazed. These alloys are generally formed of 92% titanium, balance chromium and manganese at present, but the trend is toward decreasing the titanium factor for cost and economic reasons. Although titanium alloys are stronger than pure titanium, 130,000–175,000 p. s. i. yield strengths as compared to 75,000 p. s. i. yield strength for pure titanium, they can be brazed under my invention by taking into consideration the desired melting point, braze strength, and braze hardness gradient and adjusting the temperature lowering and the strength increasing components accordingly. It is to be noted that the heat treating solution temperatures for these alloys are in the neighborhood of 1750° F. to 1875° F., so that the heat treating step can be combined with the brazing step, which is important from an economy aspect.

EXAMPLES OF TITANIUM BASE METALS

Examples of titanium base metals other than commercially pure titanium now being commercially offered to the trade are as follows:

| | |
|---|---|
| (1) | 2.7% chromium by weight |
| | 1.4% iron by weight |
| | 95.9% titanium by weight |
| (2) | 4% manganese by weight |
| | 4% aluminum by weight |
| | 92% titanium by weight |
| (3) | 5% aluminum by weight |
| | 5% chromium by weight |
| | 90% titanium by weight |

(where the base metals are formed of alloys of which the above are examples of current materials alpha-beta phases). Beta combinations are the future in this field and involve higher alloy contents.

Where titanium base alloys, presently available or newly developed, are solution heat treated at temperatures below about 1850° F. and where a high strength braze is still desired, the substitution of silver metal and/or manganese for part or all the copper would lower the braze temperature sufficiently. A braze of this combination is given in the following Table VI.

*Table VI.—Melting point 1800°±50° F.*

| | |
|---|---|
| A. | 75% eutectic |
| | 15% silver |
| | 10% copper |
| B. | 75% eutectic |
| | 20% silver |
| | 5% manganese |
| C. | 75% eutectic |
| | 15% silver |
| | 5% copper |
| | 5% manganese |

Another highly desirable characteristic of my brazing alloy is that the effect known in the art as "washing" can be minimized. Washing, refers to that action wherein the braze metal (which it must be remembered is largely nickel) and the base metal dissolve or alloy into one another to form a new alloy, thereby rendering somewhat inaccurate original strength and hardness estimates. I have found that the washing effect can be controlled when the nickel-titanium components forming the bulk of the braze powder are not in the 34% Ti–66% nickel combination but differ from this composition, for example, if they are combined in the ratio of 70% nickel to 30% titanium. Then by adding up to 6% of titanium metal by weight, washing is minimized. Although an alloy of this type would have a melting point higher than that of the eutectic, the melting point can be controlled, as taught here, by adding metals like copper, silver, manganese and antimony. This alloy has the advantage that the titanium addition by alloying with the near-eutectic composition, counteracts the tendency for the near-eutectic alloy to wash or dissolve heavily the base titanium metal. However, washing can be beneficial and where increased alloying is desired an alloy composition having slightly less titanium than the eutectic composition (up to 4% by weight) would alloy rapidly with the base titanium alloy. It may be advantageous under certain conditions to have an off eutectic alloy available.

Other advantages of my braze alloys are that they have a high resistance to oxidation and to chemical corrosion, while silver or copper base alloys are relatively poor in this respect.

In the claims that follow the expression "metals of the copper group" refers to copper and silver, classified in Group I of Mendeleeff's Periodic Arrangement of the Elements. The metal nickel also serves the same function as do the copper group metals, namely lowering of the braze melting point, only when the titanium content of the braze alloy is high and the addition of the proper amount of nickel would lower to the theoretical eutectic composition.

The expression "metals of the chromium series" refers to the metals chromium, manganese, and cobalt, arranged in series 4 of Mendeleeff's table. The metal beryllium also serves the same function, namely to increase the strength of the joint and to make possible levelling the hardness gradient of the braze, interface and base alloy.

The term "nickel-titanium eutectic" will refer to an alloy of substantially 66% nickel and 34% titanium that may be prepared as described previously.

Throughout this expression the terms "brazing" and "bonding" have been used synonymously. The term brazing, originally employed where brass was used as the bonding agent because of its high strength and low melting point as compared to soft solder for instance, is now commonly employed in the art with reference to newer processes wherein the common factor is the joining of base metals by a bonding (brazing) agent that has a melting point lower than that of the base metals and effects a certain surface penetration or intersolution with the faces of the base metals (the interface) to make a joint. The process will be referred to as "bonding" in the claims.

The expression "titanium base metals" as employed in the claims refers to the composition of the base components bonded together which are composed either of pure titanium or of titanium alloys of the general order of those previously described.

What is claimed is:

1. A material for bonding together titanium base metal and other metals or alloys to provide a joint having high tensile and shear strength at room and at elevated temperatures consisting essentially of about 65 to 92% by weight of a binary alloy of about 70 to 60% nickel and 30 to 40% titanium, and the balance being a material selected from the group consisting of copper, silver, chromium, manganese, cobalt, and beryllium and mixtures of the foregoing.

2. A material in accordance with claim 1 characterized in that the copper and silver are present in the amount of from 8 to 35%, and the chromium, manganese, cobalt, and beryllium are present in an amount of from about 2 to 15%.

References Cited in the file of this patent

UNITED STATES PATENTS

| | | |
|---|---|---|
| 2,105,653 | Honda | Jan. 18, 1938 |
| 2,184,769 | Alexander | Dec. 26, 1939 |
| 2,303,746 | Kihlgren | Dec. 1, 1942 |
| 2,491,284 | Sears | Dec. 13, 1949 |
| 2,512,455 | Alexander | June 20, 1950 |
| 2,575,808 | Halverson | Nov. 20, 1951 |
| 2,637,521 | Constantine | May 5, 1953 |
| 2,674,542 | Alexander | Apr. 6, 1954 |
| 2,713,196 | Brown | July 19, 1955 |

FOREIGN PATENTS

| | | |
|---|---|---|
| 677,213 | Great Britain | Aug. 13, 1952 |

OTHER REFERENCES

Product Engineering, November 1949, p. 146, "Our Next Major Metal Titanium."

Brazing Titanium to Titanium and to Mild and Stainless Steels, by Batelle Memorial Institute, published by Wright Air Development Center, Wright Paterson Air Force Base, Ohio, WADC Technical Report 52–313, Part 1, published November 1952, pp, 1–11 and 28–34.